United States Patent [19]

Delp

[11] Patent Number: 5,287,652
[45] Date of Patent: Feb. 22, 1994

[54] HYDROPONIC APPARATUS

[76] Inventor: Reinard C. Delp, P.O. Box 123, Laytonville, Calif. 95454

[21] Appl. No.: 843,308

[22] Filed: Feb. 28, 1992

[51] Int. Cl.$^5$ ............................................. A01G 31/00
[52] U.S. Cl. ........................................... 47/79; 47/62; 47/59
[58] Field of Search ............... 47/48.5, 59, 62, 79 OR

[56] References Cited

U.S. PATENT DOCUMENTS

| | | | |
|---|---|---|---|
| 4,037,359 | 7/1977 | Peng et al. | 47/59 |
| 4,166,341 | 9/1979 | Vestergaard | 47/59 |
| 4,189,867 | 2/1980 | Schneck | 47/62 |
| 4,198,783 | 4/1980 | Leroux | 47/79 |
| 4,242,835 | 1/1981 | Mondragon Sorribes | 47/79 |
| 4,294,037 | 10/1981 | Mosse et al. | 47/59 |
| 4,328,641 | 5/1982 | Tesch | 47/59 |
| 4,371,995 | 2/1983 | Donhauser | 47/59 |

FOREIGN PATENT DOCUMENTS 2901713 7/1979 Fed. Rep. of Germany .......... 47/59
2813410 10/1979 Fed. Rep. of Germany .......... 47/59

*Primary Examiner*—Carl D. Friedman
*Assistant Examiner*—Wynn E. Wood
*Attorney, Agent, or Firm*—Larry D. Johnson

[57] ABSTRACT

A hydroponic apparatus invention provides a modular, self-contained hydroponic growing structure having an extendable/retractable, generally semi-cylindrical cover portion enabling control of light and/or complete light deprivation to the growing plants, and further includes mechanisms for control of water and feeding.

12 Claims, 2 Drawing Sheets

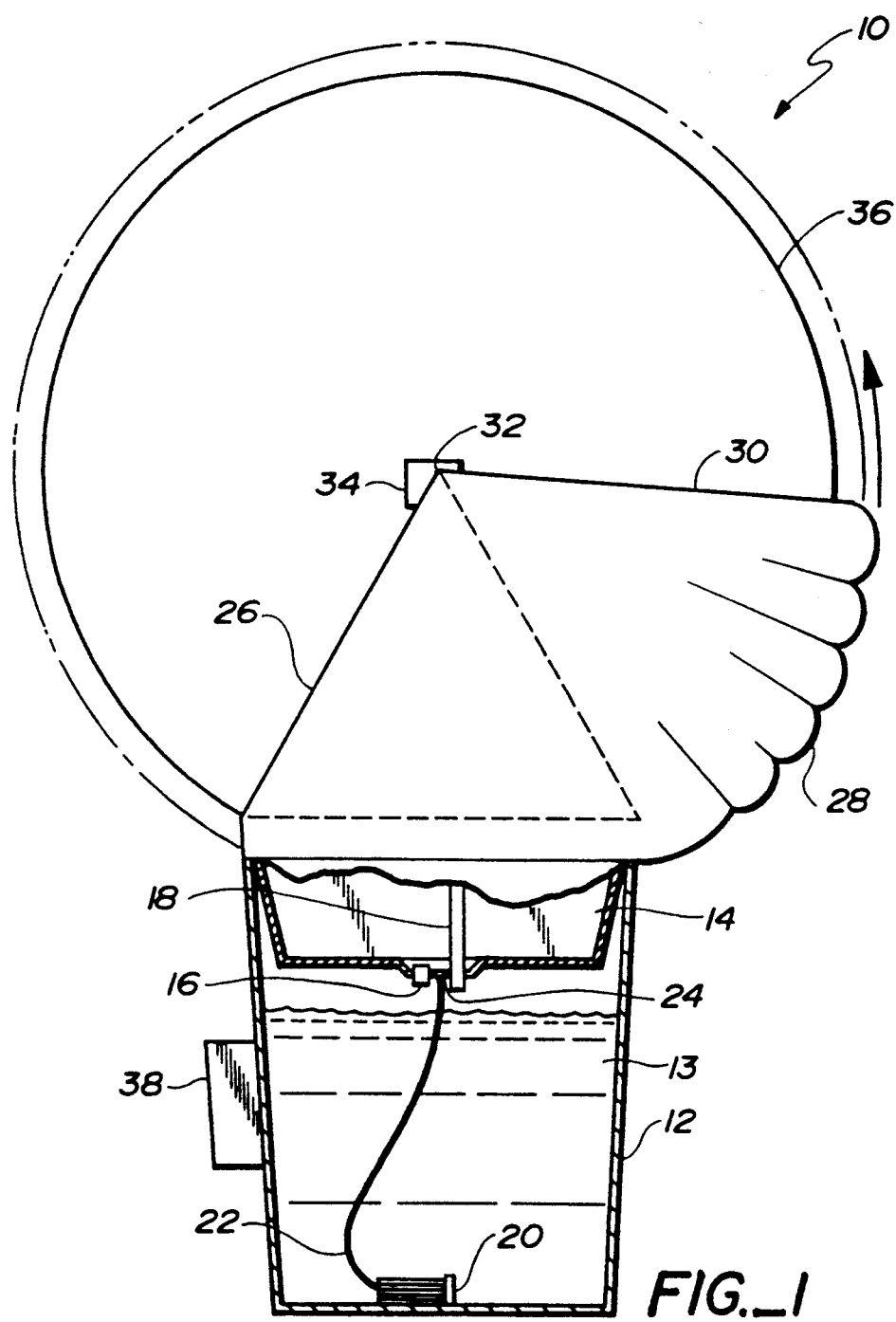
FIG._1

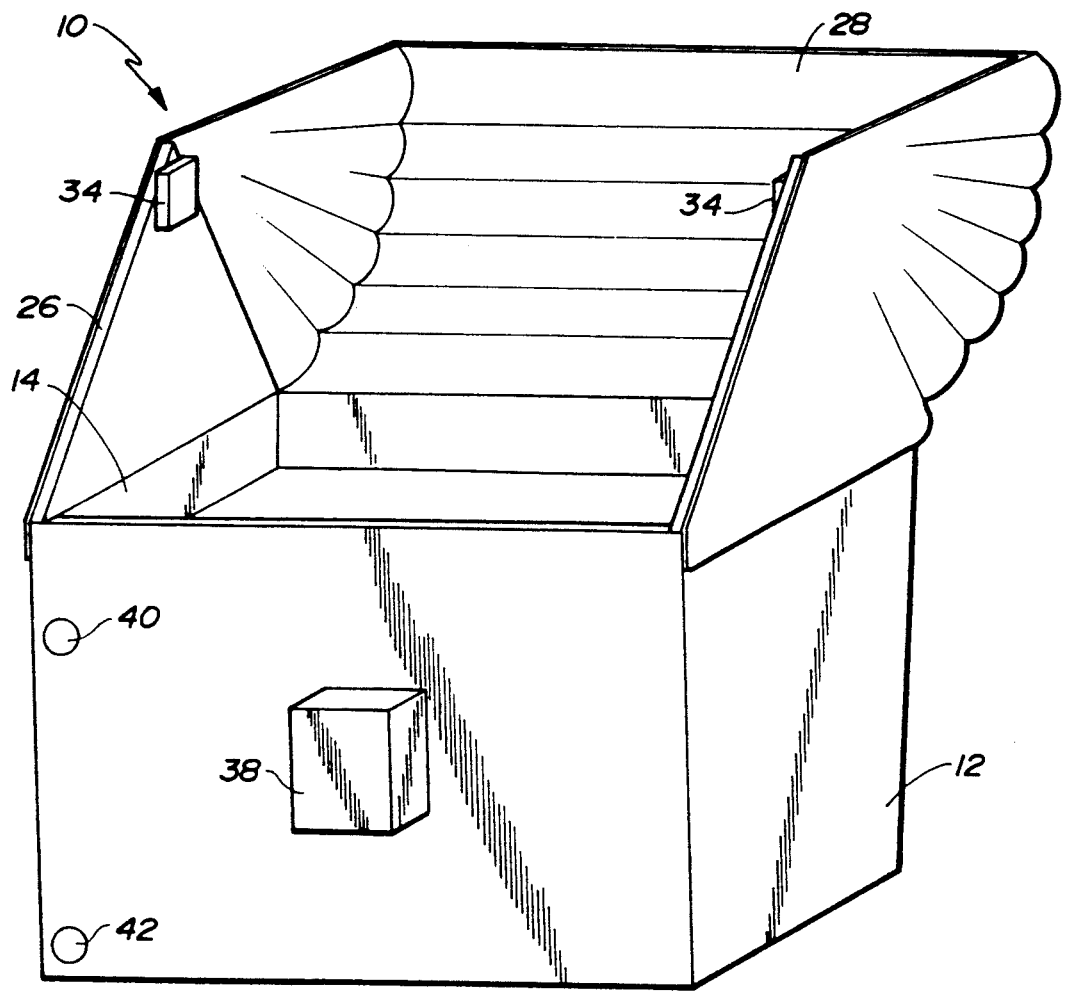
FIG_2

HYDROPONIC APPARATUS

BACKGROUND OF THE INVENTION

1. Field of the Invention

This invention relates generally to agricultural and horticultural tools and implements, and more specifically to an improved hydroponic apparatus for growing plants.

2. Description of the Prior Art

Hydroponic and aerophonic growing systems are well known, and increasing in popularity due to their improved plant growing characteristics. However, known systems do not enable complete control of watering, feeding, temperature and light to the growing plants.

SUMMARY OF THE INVENTION

The hydroponic apparatus of this invention provides a modular, self-contained hydroponic growing structure having an extendable/retractable, generally semi-cylindrical cover portion enabling control of light and/or complete light deprivation to the growing plants. The apparatus further includes control of water, feeding, and temperature.

BRIEF DESCRIPTION OF THE DRAWINGS

FIG. 1 is a side elevation schematic view of a hydroponic apparatus of this invention; and FIG. 2 is a perspective schematic view of a hydroponic apparatus of this invention.

DETAILED DESCRIPTION OF A PREFERRED EMBODIMENT

FIG. 1 is a side elevation schematic view of a hydroponic apparatus for growing plants 10 of this invention. Apparatus 10 preferably includes the following components:

A tank portion 12 for containing a quantity of water and dissolved nutrients 13 and acting as a base and support structure for the rest of the apparatus. This tank portion may be made of plastic or any other suitable material (including insulating material where appropriate), and may have dimensions of approximately 60 cm. high with a base of 80 cm. by 40 cm.

A plant tray portion 14 supported above the tank portion and used for physically containing the growing plants. The plant tray portion includes a drain 16 (which may include a filter screen) to the tank portion, and an overflow valve 18. The plant tray may have dimensions of approximately 80 cm. by 40 cm. by 12 cm. deep.

A (preferably submersible) pump member 20 conditioned to periodically deliver a portion of the water and dissolved nutrients from the tank portion to the plant tray portion. The pump or its water line 22 preferably includes an aeration port 24 to mix air with the pumped water. The plant tray drain 16 permits free backflow of the water to the tank when the pump is off.

A mounting frame member 26 supported over the plant tray portion, and carrying a movable cover portion 28 for selective placement of the cover over the plant tray portion. This cover portion is preferably made of opaque material, so that when it is fully extended over the plant tray, external light is effectively prevented form reaching the plants. The cover portion may comprise a collapsible material attached to a rod 30, which can be moved about axis 32 by motor 34, and may include supporting cage 36 to support the erected cover. Alternatively, a radial array of supports might be used to erect the cover in a fan-like structure, obviating the supporting cage. The apparatus may include, if desired, an internal grow light system, preferably mounted on the frame or supporting cage.

A controller portion 38 enabling selective placement of the cover portion over the plant tray portion, and/or control of the pump (and, where included, the grow light system). This controller may be a simple manual switch control to operate the cover motor and/or pump, or be a more sophisticated computer-based timer unit that could be programmed via keypad instructions or other input for specific light deprivation and watering/feeding timetables. For example, a given set of plant seeds could include recommended light deprivation programming instructions on the package, or even include computer-readable (e.g., bar code or other) instructions. Possible power supplies for the controller, timer and pump include an AC line, DC batteries, solar power, or a combination of these.

FIG. 2 is a perspective schematic view of a hydroponic apparatus 10 of this invention, this view without the supporting cage, and further illustrating a tank fill inlet 40 for adding water and nutrients (and testing of both), and a tank drain outlet 42 to empty the tank.

Watering and feeding control: In the simplest version of the invention, the watering is only timed by the computer-timer. The growing media (rock, soil, rockwool, etc.) is flooded by the pump to a certain level (adjustable with the overflow) and drained completely after the pump shuts off. The open drop of the water-food solution during pumping provides extra aeration for the solution. If topfeeding is preferred, the pump is connected to a drip-system, and excess water will still be recycled. An extra channel for misting and foilar feeding can be added. With the use of plastic chambers in the tray the system can be converted to the "film feeding" method. The roots are never submerged but only misted with the water-food solution (aerophonics). With the use of moisture sensors in the growing media and above (growspace) the system can control itself automatically.

Temperature control: The simplest version allows a manual temperature control. The temperature of the water-food solution is the main factor for temperature conditions in the growing media, and the use of clear, colored, or shading hoods also influences the temperature in the growspace above the growing media. The use of artificial light or the light-deprivation system influences the temperature as well. The temperature of the water-food solution can be controlled with the initial temperature of the water and insulation of the tank. More sophisticated versions include temperature sensors in the water which can control a "hot-cold system" or water heater in the tank. Different sensors for outside and inside the system can allow it to control its own temperature a) in connection with the automated selection of hoods, driven by the motors but computer-selected from a variety of hoods, and b) air pumps and blowers can pump warm outside air into the liquid and raise its temperature to adjust a temperature loss during the night and aerate the solution. Blowers can adjust the temperature automatically in the growspace above the growing media.

Light control: The simplest version has a timer controlled light deprivation system which allows the user to program the light duration (day length) for the system. It can be kept dark for a specific time to force flowering or create a "fall season" during the summer. Also, the channel for the light deprivation system can be used to extend light duration with the use of growlights (light extension). The light strength and spectrum can be controlled manually with the use of colored or shading hoods. An extra channel for light extension provides further possibilities of light control and the feedback from light sensors allows the system to automatically adjust its light conditions. The automated selection from a variety of colored or shading hoods allows control of the light spectrum and intensity. Moonshine can be simulated with special spectrum growlights.

Controller mechanism: The basic controller consists of a multichannel timer and the other components to control the watering, feeding and the light duration automatically. To monitor the consistency of the water food solution, the apparatus provides access to the solution in the tank through an opening in the tray. The PH and strength of the solution can be measured and adjusted. With the use of sensors the system becomes truly automatic in respect to temperature, moisture, light intensity, light duration, and light spectrum. Sensor information overrules the timer program (or makes it unnecessary) so that the system can control itself with the sensor information only.

Digital measuring instruments can be incorporated in the system and measurements of PH and PPM (strength) can be monitored by the computer so that automatic adjustments can be made. Further growing performance can be monitored and a readout can indicate the systems performance in relation to a variety of factors. Programming instructions for the computer could be provided for a specific species of plant or other living organism together with the seed and special set up instructions (medium to be used, consistency of the solution, and the service interval). The program can be fed to the computer automatically thus eliminating the need for complicated programming by the user. The controller is designed as a separate unit which can be disconnected from the automated system it controls, which enables easy programming.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A hydroponic apparatus for growing plants comprising:
   a tank portion for containing a quantity of water and dissolved nutrients;
   a plant tray portion supported above said tank portion, said plant tray portion including a drain to said tank portion;
   a pump member conditioned to deliver a portion of said water and dissolved nutrients from said tank portion to said plant tray portion;
   a frame member adjacent said plant tray portion, said frame member bearing a movable cover portion for placement over said plant tray portion and including at least one motor for driving said movable cover portion; and
   a controller portion enabling selective placement of said cover portion over said plant tray portion.

2. The hydroponic apparatus of claim 1 wherein said pump member periodically delivers water and dissolved nutrients to said plant tray portion.

3. The hydroponic apparatus of claim 1 wherein said movable cover portion comprises a generally semi-cylindrical cover.

4. The hydroponic apparatus of claim 1 wherein said movable cover portion is opaque.

5. The hydroponic apparatus of claim 1 wherein said movable cover portion comprises a flexible material.

6. The hydroponic apparatus of claim 1 wherein said controller portion controls said pump member.

7. A hydroponic apparatus for growing plants comprising:
   a tank portion for containing a quantity of water and dissolved nutrients;
   a plant tray portion supported above said tank portion, said plant tray portion including a drain to said tank portion;
   a pump member conditioned to deliver a portion of said water and dissolved nutrients from said tank portion to said plant tray portion;
   a frame member adjacent said plant tray portion, said frame member bearing a movable cover portion for placement over said plant tray portion; and
   a controller portion enabling selective placement of said cover portion over said plant tray portion, said controller portion further controlling said pump member.

8. The hydroponic apparatus of claim 7 wherein said pump member periodically delivers water and dissolved nutrients to said plant tray portion.

9. The hydroponic apparatus of claim 7 wherein said movable cover portion comprises a generally semi-cylindrical cover.

10. The hydroponic apparatus of claim 7 wherein said movable cover portion is opaque.

11. The hydroponic apparatus of claim 7 wherein said frame member includes at least one motor for driving said movable cover portion.

12. The hydroponic apparatus of claim 7 wherein said movable cover portion comprises a flexible material.

* * * * *